C. W. PETERS.
MILK BOTTLE COVER.
APPLICATION FILED MAY 12, 1915.

1,201,620.

Patented Oct. 17, 1916.
2 SHEETS—SHEET 1.

Inventor
C. W. Peters
By Chandler & Chandler
Attorneys

Witnesses

C. W. PETERS.
MILK BOTTLE COVER.
APPLICATION FILED MAY 12, 1915.

1,201,620.

Patented Oct. 17, 1916.
2 SHEETS—SHEET 2.

Witnesses

Inventor
C. W. Peters
By
Attorneys

UNITED STATES PATENT OFFICE.

CHARLES W. PETERS, OF PHILADELPHIA, PENNSYLVANIA.

MILK-BOTTLE COVER.

1,201,620.   Specification of Letters Patent.   Patented Oct. 17, 1916.

Application filed May 12, 1915. Serial No. 27,637.

*To all whom it may concern:*

Be it known that I, CHARLES W. PETERS, a citizen of the United States, residing at Philadelphia, in the county of Philadelphia, State of Pennsylvania, have invented certain new and useful Improvements in Milk-Bottle Covers; and I do hereby declare the following to be a full, clear, and exact description of the invention, such as will enable others skilled in the art to which it appertains to make and use the same.

This invention relates to a milk bottle cover.

An object of my invention resides in the provision of a device which may be readily attached to the top of a milk bottle and by means of which the milk bottle cap may be removed any desired number of times and replaced upon the bottle after each removal.

A further object of the invention resides in so constructing the device that when it is placed upon the top of a milk bottle it may be operated to grip the cap without first removing the cap from the bottle. This is particularly advantageous inasmuch as it allows the bottle of milk to be placed upon the table, to be consumed, in the same condition in which it arrives from the dairyman. Inasmuch as it has become the custom to sterilize milk right in the bottles and after the caps have been thereon the advantage obtained by using my device will be readily appreciated.

With these and other objects in view, such as will appear as the description progresses, my invention comprises the combination and arrangement of parts as set forth in and falling within the scope of the appended claims.

Figure 1:
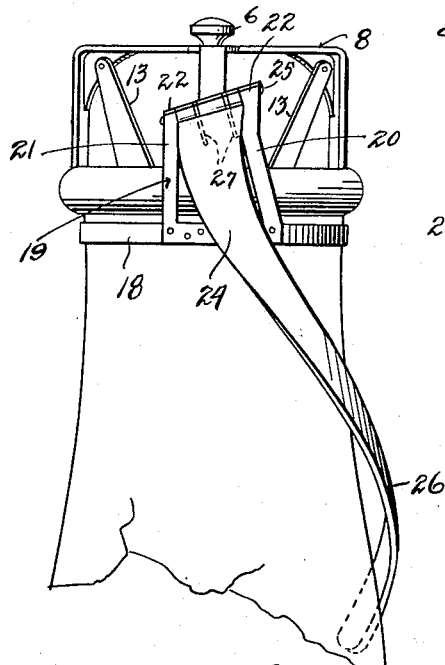
Figure 4:
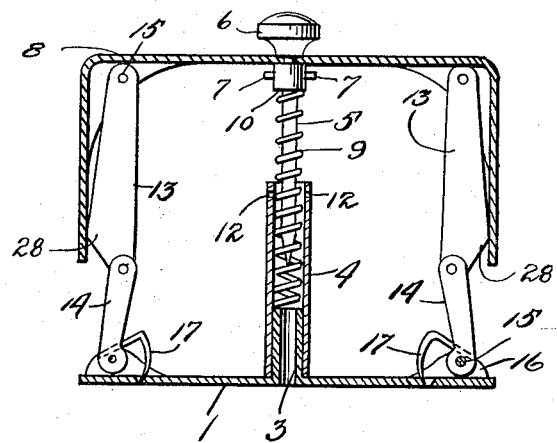
Figure 2:
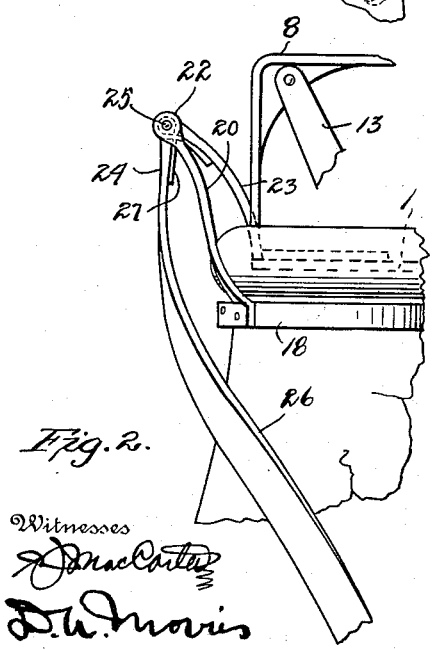
Figure 5:
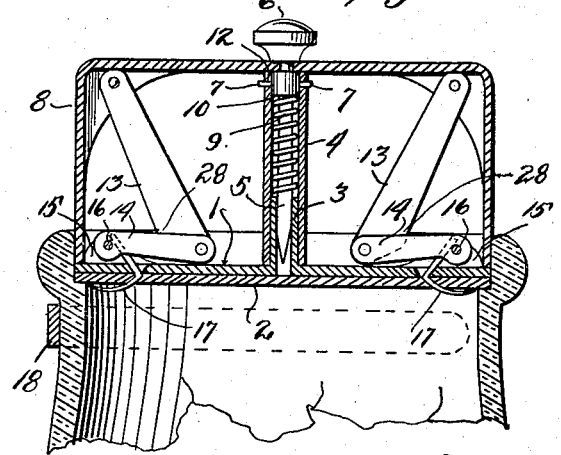
Figure 3:
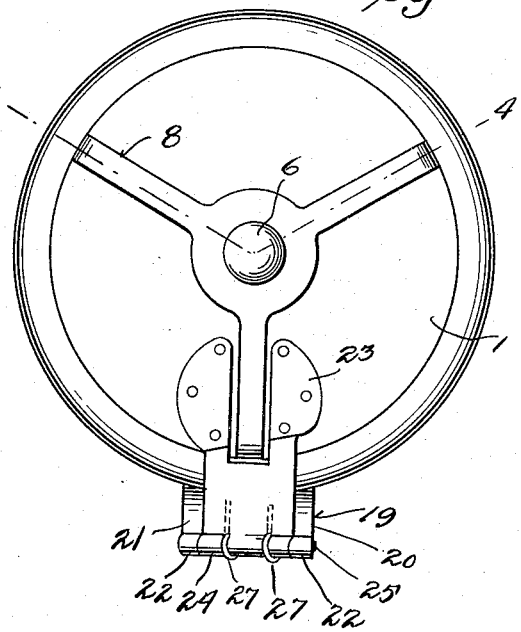
Figure 7:
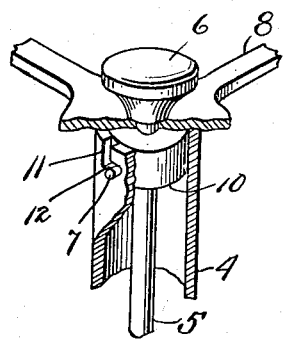
Figure 8:
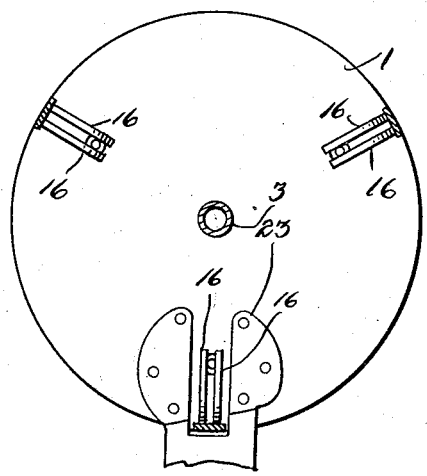
Figure 6:
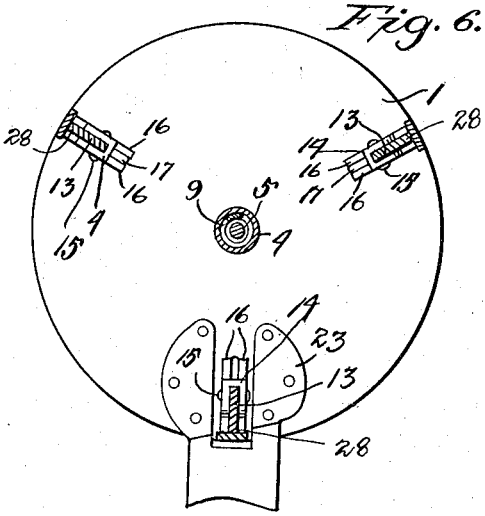

Referring to the drawing: Figure 1 is a rear elevation of my device, showing the same attached to a milk bottle. Fig. 2 is an elevational view showing the manner of connecting the operating handle to the cover. Fig. 3 is a plan view of the device. Fig. 4 is a section on the line 4—4 of Fig. 3, showing the parts of the cover in the positions they will occupy before the device is placed upon the bottle. Fig. 5 is a similar view showing the positions of the parts when the device has been placed upon the bottle and the cap is engaged. Fig. 6 is a horizontal sectional view through the cover. Fig. 7 is a fragmental detail, showing the means for locking the casing on the base plate of the cover. Fig. 8 is a plan view of the base plate of the cover.

Referring to the drawing wherein like parts are indicated by like characters throughout the several views:—In the embodiment of my invention shown in the drawing I have provided a base plate 1 which is adapted to fit in the upper end of a milk bottle and rest upon the cap 2 thereof. In order that this base plate 1 may be secured to the said cap 2 I have provided an upwardly extending resilient tongue 3 on the plate 1 to which is secured a tubular member 4, held upon the said tongue by the resiliency thereof. Slidably mounted within this tubular member 4 is a pin 5 having a head 6 on the upper end thereof and outwardly extending pins 7 below the said head. Secured to this head 6 is a supporting spider 8 of a diameter equal to the diameter of the base plate 1. This casing is adapted to seat upon the base plate 1, but is normally pushed away from the said base plate by a coil spring 9 which encircles the pin 5 and bears against a shoulder 10 thereon. In order that the spider 8 may be maintained in engagement with the base plate 1, I have provided the upper end of the tubular member 4 with a plurality of notches 11 having horizontal off-set portions 12 therein, the number of notches being equal to the number of pins 7. When it is desired to maintain the spider 8 in engagement with the base plate 1, the pin 5 is pushed downwardly by means of the head 6 against the tension of the spring 9 until the pins 7 enter the notches 11 in the tubular member 4, at which time the pin 5 may be slightly rotated until the pins 7 are located in the off-set portions 12 of the notches 11, this motion being allowed because of the fact that the spider 8 is loosely mounted on the head 6 of the pin 5.

In order that this base 1 and the spider 8, which form the cover proper, may be secured to the milk bottle cap 2 I have pivoted within the spider 8 a plurality of links 13 which have levers 14 pivoted thereto at their lower ends, which levers are in turn pivoted at 15 between ears 16 formed on the base plate 1. Adjacent each pair of ears 16 is a hole in the base plate through which arcuate claws 17, which are secured to the ends of the levers 14, extend. These claws 17 are so constructed that when the parts are in the positions shown in Fig. 4 of the drawing the ends thereof will not protrude below the base plate 1, but when the device is in place on a milk bottle and the parts are in the positions shown in Fig. 5 the claws will extend through the milk bottle cap and secure the same to the base plate 1.

In order that this cover may be hingedly supported on the milk bottle and detachably secured thereto I have provided a resilient split collar 18 which is adapted to encircle the neck of the bottle. Secured to this collar and extending upwardly therefrom is a substantially U-shaped plate 19, one leg 20 of which is longer than the other leg 21. Each of these legs is provided with a turned end to form a bearing member 22. These bearing members are in alinement and their axis is inclined from the horizontal, as clearly shown in Fig. 1 of the drawing. Secured to the base plate 1 is a hinge plate 23 which is secured to a second hinge plate 24 by a pintle 25, the ends of which protrude slightly beyond the sides of the hinge plate and are mounted in the bearing members 22. The hinge plate 24 is extended and forms an operating handle 26 which extends about the bottle in a helical path. The base plate 1 is normally held into engagement with the top of the bottle and the cover in place thereon by a coil spring 27, which also maintains the handle 26 in spaced relation to the bottle.

In applying this device to a milk bottle the parts are in the positions shown in Fig. 4 of the drawing. The collar 18 is passed about the neck of the bottle and the base plate swung down onto the cap thereof. The head 6 of the pin 5 is then grasped and pushed downwardly until the pins 7 engage in the notches 11 in the tubular member 4, at which time the pin 5 is turned and the pins 7 pass into the off-set portions 12 of the notches 11. During this downward movement the links 13 and the levers 14 move about their pivots and cause the claws to penetrate the milk bottle cap. The links 13 are provided with extensions 28 which bear against the inner face of the spider 8 when the parts are in the positions shown in Fig. 4 and thus prevent the links 13 and the levers 14 moving into perfect alinement so that as soon as the pin 5 is moved downwardly the said links and levers will start their movement. After the device has been placed upon the bottle in this manner the bottle cap may be removed any number of times.

When pouring milk from a bottle it is natural for a person to pass the hand almost completely around the neck of the bottle. It is for this reason that I have passed the handle 26 about the bottle in a helical path so that it will be located on the side of the bottle away from the person. By this arrangement the handle will be operated by the index finger of the person, to open the cover. After this cover has been opened or raised it is only necessary for the person to tilt the bottle, at which time the milk will flow therefrom. This particular arrangement of the handle allows the cover to be raised and the milk poured from the bottle with the greatest ease inasmuch as it does not necessitate the distortion of the wrist of the operator.

From the foregoing description it will be seen that I have provided a very simple and efficient device by means of which the closure cap of a milk bottle may be raised a great number of times and replaced automatically upon the bottle after each raising. I have so constructed the device that the same operation of grasping the neck of the bottle will also raise the cover and I have located the operating handle in such position that the pouring of the milk from the bottle and the raising of the cover will be accomplished with the greatest of ease.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a bottle cover, the combination with a base plate, of claws mounted thereon, means for moving said claws relative to the base plate to cause them to penetrate a bottle cap, while the base plate is stationary, means for locking said claws in their penetrating relation with the said cap and means for lifting the base plate and cap from the bottle.

2. In a bottle cover, the combination with a base plate, of a tubular member extending upwardly centrally thereof, a pin telescopically mounted in said tubular member, resilient means for normally pushing said pin outwardly, a supporting spider loosely mounted on the upper end of said pin, levers pivoted to the base plate, links pivoted to the levers and to the inner face of the spider, claws secured to the links, the said links and levers being so arranged that upon the movement of the casing toward the base plate the claws will be projected through the bottom of the base plate so as to penetrate a bottle cap and means for maintaining the said spider in engagement with the base plate.

In testimony whereof, I affix my signature, in the presence of two witnesses.

CHARLES W. PETERS.

Witnesses:
CLAYTON McCLURE,
G. R. BRADBURY.